United States Patent [19]
Naber et al.

[11] Patent Number: 5,732,551
[45] Date of Patent: Mar. 31, 1998

[54] METHOD FOR MONITORING THE PERFORMANCE OF A CATALYTIC CONVERTER USING MASS TRANSFER COEFFICIENTS

[75] Inventors: Jeffrey D. Naber; Donald J. Remboski, Jr., both of Dearborn, Mich.

[73] Assignee: Motorola Inc., Schaumburg, Ill.

[21] Appl. No.: 764,658

[22] Filed: Dec. 11, 1996

[51] Int. Cl.$^6$ .................................................. F01N 3/20
[52] U.S. Cl. .............................. 60/274; 60/276; 60/277
[58] Field of Search .......................... 60/274, 276, 277; 73/118.1; 701/103, 109

[56] References Cited

U.S. PATENT DOCUMENTS

| | | | |
|---|---|---|---|
| 5,289,678 | 3/1994 | Grutter | 60/277 |
| 5,351,484 | 10/1994 | Wade | 60/274 |
| 5,357,751 | 10/1994 | Orzel | 60/274 |
| 5,357,753 | 10/1994 | Wade | 60/274 |
| 5,363,646 | 11/1994 | Orzel et al. | 60/274 |
| 5,627,757 | 5/1997 | Comignaghi et al. | 60/277 X |

OTHER PUBLICATIONS

"A Review of the Dual EGO Sensor Method for OBD-II Catalyst Efficiency Monitoring," The Engineering Society for Advancing Mobility Land Sea Air and Space Technical Paper Series; Fuels & Lubricants Meeting & Exposition Baltimore, Maryland, Oct. 17-20, 1994, Jeffery S. Hepburn, et al. Ford Motor Co.

Primary Examiner—Tony M. Argenbright
Attorney, Agent, or Firm—Jasper W. Dockrey

[57] ABSTRACT

A method for monitoring the performance of a catalytic converter includes the monitoring of output from a first gas sensor (16) positioned upstream from a catalytic converter (12) and a second gas sensor (18) located at a position downstream from the catalytic converter (12). An engine controller (20) receives the output of the first and second gas sensors (16,18) and also receives estimates of the exhaust gas mass flow rate and the catalyst temperature within the catalytic converter (12). The exhaust gas mass flow rate and the catalyst temperature are used to calculate a mass transfer coefficient that is determinative of the conversion efficiency of the catalytic converter (12). A monitoring parameter is determined using the output of the first and second gas sensors (16,18), and the monitoring parameter is normalized to the coefficient. The engine controller (20) then accumulates a data set and compares the values of the data set with previously programmed pass/fail criteria to determine the performance of the catalytic converter (12).

13 Claims, 3 Drawing Sheets

METHOD FOR MONITORING THE PERFORMANCE OF A CATALYTIC CONVERTER USING MASS TRANSFER COEFFICIENTS

FIELD OF THE INVENTION

This invention relates, in general, to exhaust gas control systems and methods of operation, and more particularly, to control systems and methods for monitoring the efficiency of a catalytic converter.

BACKGROUND OF THE INVENTION

Many environmental pollution laws currently in effect in the United States and many foreign countries, require that exhaust emission reduction equipment in automotive vehicles be continuously monitored by on-board-diagnostic (OBD) systems. The function of the OBD system is to report system failure messages to the vehicle operator when emission control devices no longer meet the mandated emission levels. A key element of exhaust gas emission reduction systems is the catalytic converter, which in current automotive applications is used to simultaneously reduce the levels of carbon monoxide, oxides of nitrogen, and unburnt hydrocarbons in the exhaust.

Several OBD systems presently in use monitor the performance of the catalytic converter employ a single-valued ratio of the number of voltage level transitions (switches) of two heated-exhaust-gas-oxygen (HEGO) sensors. To monitor the effectiveness of the catalyst, one HEGO is placed in the exhaust gas upstream from the catalytic converter, and the other HEGO is placed in the exhaust gas downstream of the catalytic converter. A controller receives output from the HEGO sensors and determines the number of voltage level transitions of the downstream HEGO relative to the number of voltage level transitions of the upstream HEGO.

The switching ratio of the upstream and downstream HEGO sensors can be used to estimate the amount of oxygen stored on the catalyst. This information is important because oxygen stored on the catalyst provides a source of oxygen for the oxidation of toxic gases in automotive engine exhaust. By comparing the air-fuel ratio of the exhaust gas flowing into the catalytic converter with that flowing out of the catalytic converter, an estimate of stored oxygen can be obtained. When the catalyst is no longer able to store sufficient oxygen, the performance of the catalytic converter declines and toxic gases can pass through the exhaust system and into the environment. When the estimated oxygen storage falls below a predetermined level, the controller alerts the operator that exhaust system maintenance is necessary.

Although HEGO sensors are reliable and can function in the high-temperature, corrosive environment of an exhaust gas system, the switch ratio technique has poor resolution and only provides an ability to determine gross changes in the catalyst conversion efficiency. Additionally, the switch ratio technique requires calibration when there are system changes in the engine or the catalyst. Furthermore, the switch ratio technique does not employ statistical analysis to identify erroneous test data or to determine the reliability of the information received from the HEGO sensors. Accordingly, an improved catalytic performance monitoring method is necessary to satisfy the more stringent exhaust emission control mandated by current and future air pollution control laws.

DETAILED DESCRIPTION OF PREFERRED EMBODIMENTS

The present invention is for a method of monitoring the performance of a catalytic converter, where the catalytic converter is used in an exhaust gas stream to oxidize exhaust gases passing through the catalytic converter. The inventive method provides an on-board-diagnostic technique using exhaust gas sensors placed upstream and downstream of the catalytic converter, and an engine controller that receives electrical signals from the upstream and downstream sensors, in addition to mass air flow information and catalyst temperature information. The controller monitors the output of the exhaust gas sensors and generates a monitoring parameter using the output of the sensors. Then, one or more coefficients determinative of a conversion efficiency of a catalytic converter are calculated using the catalyst temperature and the mass air flow of the engine generating the exhaust gases. The monitoring parameter is normalized to the coefficient and a data set is accumulated by the controller. To determine the performance of the catalytic converter, individual values within the data set are compared with pass/fail criteria and the comparison information is evaluated by the controller. If the data set values are not within a predetermined operational range, the controller alerts the operator to obtain service for the exhaust system.

Figure 1:
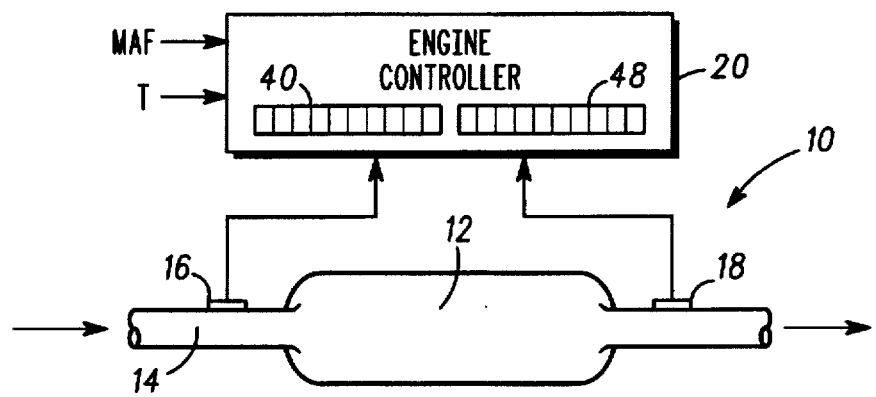
FIG. 1 is a schematic diagram of an exhaust gas system electrically coupled to an engine controller.

Shown in FIG. 1 is a schematic diagram of an exhaust control system arranged in accordance with the invention. An exhaust gas system 10 includes a catalytic converter 12 located within an exhaust conduit 14. A first gas sensor 16 is mounted to exhaust conduit 14 at a position upstream of catalytic converter 12, and a second gas sensor 18 is mounted through exhaust conduit 14 at a position downstream of catalytic converter 12. An engine controller 20 receives signals from first and second gas sensors 16 and 18, and air-fuel ratio information and catalyst temperature information. It is important to note that where a partitioned catalyst is employed in catalytic converter 12, second gas sensor 18 can be placed within catalytic converter 12 to monitor a portion of the catalyst bed within the converter.

As will subsequently become apparent, the performance monitoring method of the invention can be employed using different types of exhaust gas sensors that are capable of producing a variety of output signals. Various embodiments of the invention employ either voltage level transitions, time delay factors, analog voltage level or current outputs. An important advantage of the invention includes the ability to utilize different types of sensors having different characteristic outputs. Accordingly, first and second gas sensors 16 and 18 can be heated-exhaust-gas-oxygen (HEGO) sensors, universal-exhaust-gas (UEGO) sensors, hydrocarbon sensors (HC), and the like. This is possible because the method of the invention employs a normalization of operating parameters related to the conversion efficiency of catalytic converter 12.

A determination of conversion efficiency of catalytic converter 12 depends upon knowledge of mass transfer of various gases in the exhaust gas stream to the catalyst material within catalytic converter 12. The bulk gas transport of a gas species i within an exhaust gas stream passing through catalytic converter 12 can be described by the partial differential equation (1), $$\partial z_i/\partial \tilde{t} + \partial z_i/\partial \tilde{x} = -\beta(z_i - y_i) \tag{1}$$

where $z_i$ is the bulk gas mole fraction of species i, $y_i$ is the interface mole fraction of species i, $\tilde{t}$ is a unit time expressed as $t/\tau$, where $\tau$ is the resonance time of gas within catalytic converter 12, $\tilde{x}$ is a unit length expressed as x/L, where L is the catalyst length, and $\beta$ is a bulk gas mass transfer coefficient.

In addition to bulk gas transport through catalytic converter 12, exhaust gases must also pass through an interface region between the catalyst surface and the main body of the exhaust gas stream. The interface mass transfer and adsorption characteristics of the exhaust gas stream can be expressed by an interface mass transfer equation (2), $$\beta(z_i - y_i) = \phi y_i(1 - s_i) \tag{2}$$

where $s_i$ is the surface absorption fraction of species i on the catalyst material, and $\phi$ is the gas adsorption coefficient. A relationship for the surface storage of species i on the catalyst material can be expressed by equation (3), $$\gamma \partial s_i/\partial t = \phi y_i(1 - s_i) - \sum_j R_{ij}(\gamma_j s_j - \gamma_i s_i) \tag{3}$$

where $\gamma$ is the surface storage coefficient, and $R_{ij}$ is the reaction coefficient of species i with species j at the catalyst surface.

Figure 2:
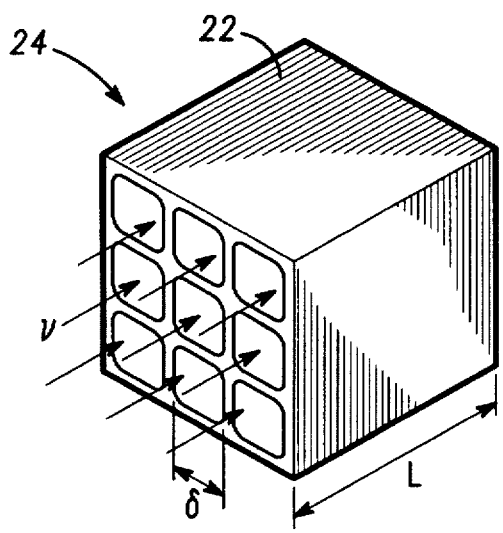
FIG. 2 illustrates a portion of a catalyst bed within a catalytic converter.

A portion of a catalyst bed 22 located within catalytic converter 12 is shown in FIG. 2. Catalyst bed 22 contains an array of channels 24 through which exhaust gases pass. The surface of each channel is coated with a catalyst material, such as platinum, palladium, rhodium, and the like. For computational purposes, catalyst bed 22 has a representational length L, and each channel within catalyst bed 22 has a representative dimension σ. An exhaust gas flows through each gas channel at velocity V. Those skilled in the art will appreciate that other geometric representations of catalyst bed are possible. For example, the catalyst bed can be an array of hexagonal channels or triangular channels, or the like.

Figure 3:
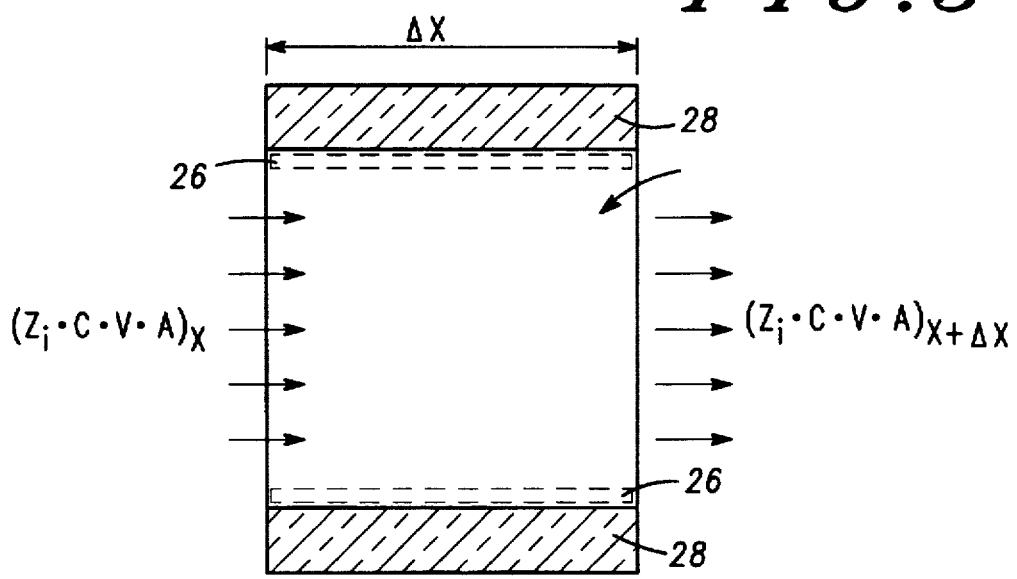
FIG. 3 is a sectional view through one of the gas channels of the catalyst bed shown in FIG. 2.

A sectional view of a representative gas channel 25 is illustrated in FIG. 3. The gas channel has a representative length ΔX and the exhaust gas flow for species i into the section is represented as $(z_iCVA)_x$. The flow of species i out of the channel section is represented as $(z_iCVA)_{x+\Delta x}$, where C is the bulk gas molar density, V is the gas velocity, and A is cross sectional area. The interface mole fraction of species i, $y_i$, is indicated in the exhaust gas flow stream within an interfacial region 26 located between the bulk gas stream and a catalyst 28.

An expression for the catalyst efficiency can be derived by applying equations (1) and (2) to catalyst bed 22. An expression can be obtained relating the mole fraction of species i in the bulk gas and in the interface region by solving equation (2) for the interface mole fraction of species i, $y_i$, and substituting the resulting expression into equation (1), equation (4) is obtained.

$$\frac{\partial z_i}{\partial \tilde{t}} + \frac{\partial z_i}{\partial \tilde{x}} = -z_i \left( \frac{\beta}{1 + \beta/\phi \left( \frac{1}{1-s_i} \right)} \right), \tag{4}$$

If it is assumed that the surface adsorption fraction of species i, $s_i$, is much less than 1, a combined mass transfer coefficient for adsorption and bulk mass transfer β' can be defined, and equation (4) rewritten as equation (5).

$$\frac{\partial z_i}{\partial \tilde{t}} + \frac{\partial z_i}{\partial \tilde{x}} = -z_i \cdot \beta', \tag{5}$$

where, $$\beta' = \frac{\beta}{1 + \frac{\beta}{\phi}}.$$

Those skilled in the art will recognize that equation (5) is a partial differential equation representing the change in the bulk gas mole fraction of species i with respect to both time and distance x. A solution for equation (5) can be expressed as equation (6).

$$z_i(x,t) = \exp(-\beta' x) f(t-x) \tag{6}$$

where the value of β can be either the simple bulk gas mass transfer coefficient, or the more exact combined mass transfer coefficient β'. To determine the catalyst efficiency, the solution to the partial differential equation (5) as expressed by equation (6) can be applied to a general definition of catalyst efficiency expressed as equation (7), $$\eta = \frac{\text{In} - \text{Out}}{\text{In}} = 1 - \frac{\text{Out}}{\text{In}} \tag{7}$$

where "In" represents the flow of exhaust gas species i into the channel section shown in FIG. 3, and "Out" represents the gas flow of species i out of channel section 25. Applying the solution for the differential equation given by equation (6) to the definintion of catalyst efficiency given by equation (7), equation (7) can be rewritten as equation (8).

$$\eta = 1 - z(x=1, t+1)/z(x=0, t) \tag{8}$$

By applying the expression for the bulk gas mole fraction of species i, $z_i$, at a position x in time t, as determined by equation (6), an expression for the catalyst efficiency as a function of mass transfer coefficient β' is obtained as equation (9).

$$\eta = 1 - \exp(-\beta') \tag{9}$$

Equation (9) indicates that the efficiency of the catalyst 28 of adsorbing species i within a bulk gas exhaust stream through the catalyst can be related to the combined mass transfer coefficient β'. As previously discussed, β' is a function of both the bulk mass transfer coefficient β and the adsorption coefficient φ. Those skilled in the art will recognize that the mass transfer coefficient β and the absorption coefficient φ can be derived from equations relating molecular diffusion and the physical parameters of catalyst bed 22. As used herein, a mass transfer coefficient β is expressed by equation (10), $$\beta = 4ShD_{ij}/\sigma^2 \tag{10}$$

where Sh is the Sherwood number, and $D_{ij}$ is the diffusivity of species i in species j. Various methods are known in the art for estimating the Sherwood number. For example, the Sherwood number for the catalyst bed shown in FIGS. 2 and 3 can be estimated from the theory of laminar flow and taking an average of a uniform wall mass concentration and a uniform wall mass flux. This procedure produces a value for the Sherwood number of about 4. The value of the adsorption coefficient $\phi$ can be expressed as equation (11), $$\phi = 4\alpha\tau v_{col}/\sigma \quad (11)$$

where $\alpha$ is adsorption effectiveness, and $v_{col}$ collision velocity.

Figure 4:
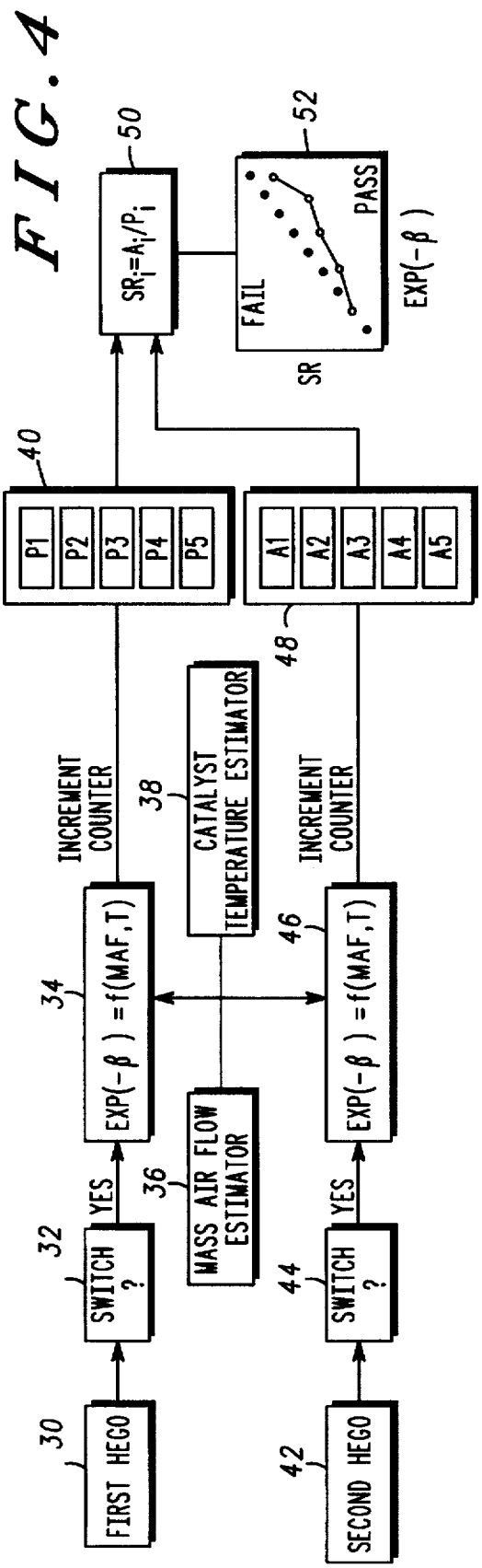
FIG. 4 is a flow chart for a method of monitoring the performance of a catalytic converter in accordance with one embodiment of the invention.

One embodiment of a method for monitoring the catalyst efficiency by normalizing a monitoring parameter is illustrated in FIG. 4. In the illustrated embodiment, a voltage output is monitored from first and second gas sensors 16 and 18. The voltage output received by engine controller 20 is monitored at location 30. The output is continuously monitored for a significant change in voltage. A substantial voltage shift is associated with an abrupt change in the amount of oxygen (or air) in the exhaust gas flowing to catalytic converter 12. For example, a "switch" is indicated where the voltage output of first gas sensor 16 changes from about 0.2 volts to about 0.8 volts, indicating a change in oxygen concentration from a high concentration level to a low concentration level. Correspondingly, a switch is also indicated by a voltage level transition from about 0.8 volts to about 0.2 volts, indicating a change from a high oxygen concentration to a low oxygen concentration in the exhaust gas stream flowing into catalytic converter 12.

When a switch is detected at instruction 32 operational control passes to instruction 34, where the combined mass transfer coefficient $\beta'$ is calculated according to the expressions set forth above. The calculation of the combined mass transfer coefficient is carried out after controller 20 receives an air flow estimate MAF from instruction 36 and a catalyst temperature estimate T from instruction 38. The MAF signal originates from an air flow rate sensor (not shown) mounted in the intake manifold of the internal combustion engine (not shown) coupled to exhaust gas system 10. Alternatively, the MAF can be estimated from engine run conditions, such as engine speed and manifold pressure, and the like. The catalyst temperature measurement T originates from a temperature sensor (not shown) mounted within catalytic converter 12. Alternatively, the catalyst temperature can be estimated from a HEGO sensor or model of the catalyst, or the like.

Once the combined mass transfer coefficient has been calculated, the exponential expression EXP ($-\beta'$) is determined. Next, a numerical value within one of several storage bins, designated P1–P5 is incremented depending upon the value of the term EXP ($-\beta'$). The storage bins are located within a data register 40 maintained by engine controller 20. A counter within each storage bin increments the numerical value within a given bin by one whenever prompted to do so by instruction 34. Each storage bin, P1–P5, defines a range of values for EXP ($-\beta'$). When the expression EXP ($-\beta'$) is evaluated by instruction 34, the numerical value is compared with the corresponding ranges designating each of the storage bins. The program identifies a storage bin having a range bracketing the calculated value, and the counter within the identified storage bin is incremented by one.

An analogous monitoring and computational sequence is carried out by engine controller 20 for the voltage output of second gas sensor 18. The voltage level transitions are monitored at instruction 42, and instruction 44 shifts program control to instruction 46 whenever a switch is detected in the voltage output of second gas sensor 18. The mass transfer coefficient $\beta'$ is calculated and the expression EXP ($-\beta'$) is determined in instruction step 46 and a counter within an individual storage bin, designated A1–A5 is incremented within a data register 48.

The foregoing process is carried out until a statistically significant amount of data is collected in data registers 40 and 48. Those skilled in the art will recognize that many standard techniques exist for determining when a statistically significant quantity of data values have been collected. For example, comparing the standard deviation of the data with standardized values for a normal distribution represents one method for determining statistical significance.

Once a statistically significant amount of data has been collected, the numerical values within corresponding storage bins of data registers 40 and 48 are ratioed at instruction step 50 to accumulate a switch-ratio data set. The values of the switch-ratio data set are then compared with predetermined pass/fail criteria at instruction step 52. If individual values within the switch ratio data set fall in the fail region as defined by a predetermined correlation, such as plot of switch-ratio versus EXP ($-\beta'$), engine controller 20 sends an alert signal to indicate that maintenance of the exhaust system is necessary.

Those skilled in the art will appreciate that the signal analysis performed at instructions 32, 44, and 52 can be performed by conventional comparator circuits within engine controller 20. Further, conventional comparator and counter circuits can be used to sort and to accumulate values within the individual bins of data registers 40 and 48.

Figure 5:
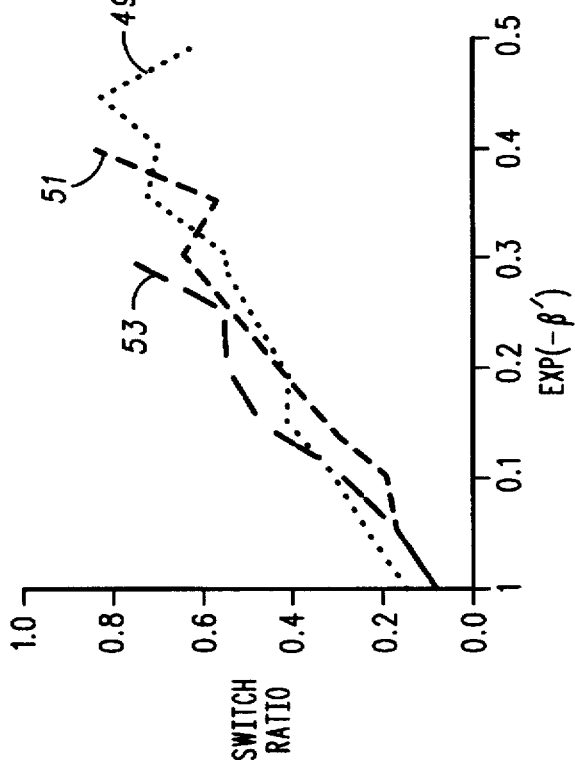
FIG. 5 is a plot of switching ratio versus the normalizing parameter EXP $(-\beta')$.

A plot of switch-ratio values versus EXP ($-\beta'$) is shown in FIG. 5. The plot of shows the relationship of the switch-ratio to EXP ($-\beta'$) for three different catalyst volumes; line 49 represents results using a catalyst volume of 25 in$^2$; line 51 a catalyst volume of 32 in$^2$; and line 53 a catalyst volume of 42 in$^2$. The experimental results indicate that the switch ratio is substantially independent of changes in catalyst geometry over a wide range of combined mass transfer coefficient values. Additionally, the experimental data indicates that the switch ratio plotted against values of the combined mass transfer coefficient provides a relatively sensitive indication of catalyst performance. The enhanced sensitivity of the monitoring parameters employed by the present invention offers a distinct advantage over monitoring techniques of the prior art.

Figure 6:
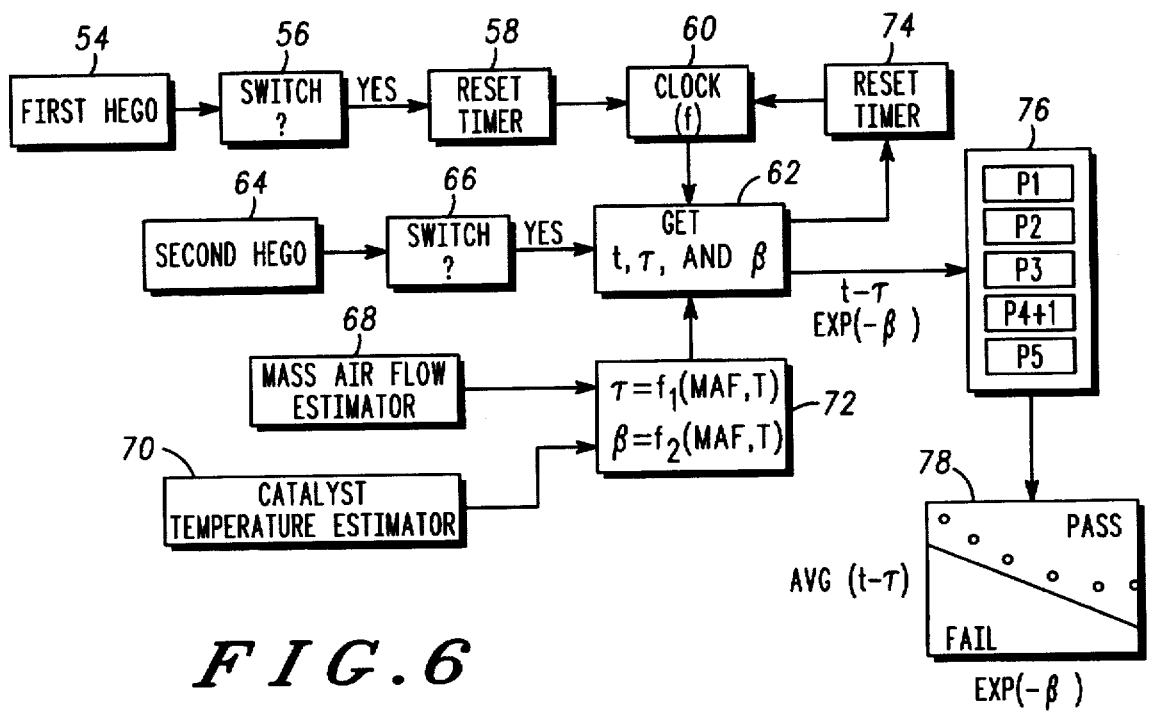
FIG. 6 is a flow chart for a method of monitoring the performance of a catalytic converter in accordance with an alternative embodiment of the invention.

An alternative embodiment of the present invention is illustrated in FIG. 6. In the alternative method, the monitoring parameter is the switching delay between the first and second gas sensors. The switching delay is then normalized using the combined mass transfer coefficient, and data set values are compared to pass/fail criteria. The voltage output of first gas sensor 16 is monitored at location 54. If a voltage level transition is detected, instruction 56 shifts program control to instruction 58 which is reset. A timer in engine controller 20 is then initiated by instruction 60 and program control transfers to instruction 62. The voltage output of second gas sensor 18 is monitored at location 64 and instruction 66 shifts program control to instruction 62 when a voltage level transition is detected from second gas sensor 18.

Engine controller 20 monitors mass air flow MAF and catalyst temperature T at locations 68 and 70, respectively. In correspondence with the previous embodiment, values for MAF and T are provided by sensors located at the intake manifold and within the catalytic converter, respectively, or estimated from engine operating conditions and a catalyst model, respectively. Given the input from locations 68 and 70, the residence time $\tau$ and the combined mass transfer coefficient $\beta'$ are calculated at instruction 72 and relayed to instruction 62. Instruction 62 calculates a switching delay, t−τ using a time t determined by instruction 60. Once a delay time is calculated, a reset command is initiated by instruction 74 and the clock at instruction 60 is reset to zero. Thus, the delay time is determined whenever a voltage level transition is detected by second gas sensor 18, since instruction 62 resets the clock after detecting a voltage level transition by second gas sensor 18. By subtracting the resonance time τ from the switching delay time t, a precise measurement of the true switching delay t−τ can be determined.

Once the delay time is calculated, instruction 62 stores the delay time in one of several bins located in a data register 76. Data register 76 contains a plurality of storage bins, designated AVG1–AVG5, each of which are defined by range of the normalizing parameter EXP ($-\beta'$). As in the previous embodiment, when a statistically significant sample has been collected, a statistical parameter is calculated from the data values stored in data register 76 and compared with pass/fail criteria. Instruction 78 compares average delay time values with standard values as a function of EXP ($-\beta'$). Whenever a selected number of average delay times fall within the fail criteria, instruction 78 sends a message to engine controller 20 and the operator is alerted that exhaust system maintenance is necessary.

Those skilled in the art will appreciate that the signal analysis performed by instruction steps 56, 66, and 78 can be performed by conventional comparator circuits located within engine controller 20. Also, a conventional timer circuit can perform the function of instructions 58, 60, and 74. Additionally, conventional comparator and computational circuits can be used to sort and compute values for the storage bins within data register 76.

Figure 7:
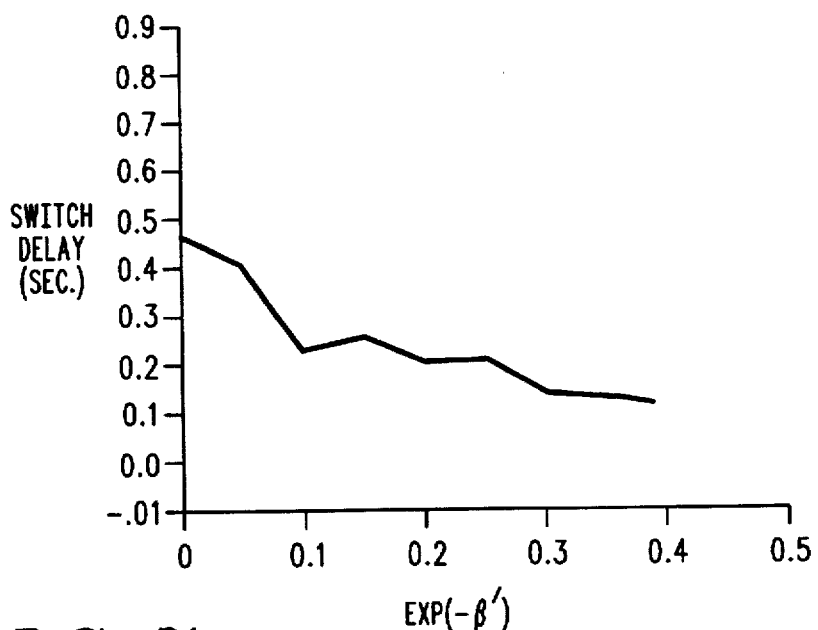
FIG. 7 is a plot of delay time versus the normalizing parameter EXP $(-\beta')$.

A plot of the average delay time versus EXP ($-\beta'$) is shown in FIG. 7. The experimental results indicate that the average delay time shows a substantial linear relationship with values of a normalizing parameter EXP ($-\beta'$). Those skilled in the art will recognize that the slope of a best fitting line through the data values can provide an indication of the relative sensitivity of the average delay time as a measure of catalyst performance. As in the previous embodiment, the enhanced sensitivity of the monitoring parameters, such as average delay time, offers a distinct advantage over switch-ratio monitoring techniques of the prior art.

It is important to note that the delay time method set forth in accordance with the alternative embodiment provides a high resolution method for measurement of the catalyst conversion efficiency of catalytic converter 12. Also, the delay time can be correlated with lean-to-rich and rich-to-lean transitions in the exhaust gas stream entering catalytic converter 12. The data shown in FIG. 7 illustrate a lean-to-rich transition. Moreover, the delay time monitor is compatible with intrusive control techniques for regulating the air-fuel ratio of an internal combustion engine utilizing exhaust gas system 10. For example, if the catalyst is operated at an oxygen rich condition, and the air-fuel ratio modulated to a lean condition, a direct measurement of the oxygen storage capacity of the catalyst is possible. Thus, monitoring the delay time as set forth in the alternative embodiment coupled with intrusive air-fuel modulation enables the use of the delay time monitor for all sizes of catalyst and exhaust gas flow rates.

Thus it is apparent that there has been provided, in accordance with the invention, a method for monitoring the performance of a catalytic converter that fully meets the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, the method of the invention can be practiced using analog current output from gas sensors placed in the exhaust gas stream. It is therefore intended to include within the invention all such variations and modifications as fall within the scope of the appended claims and equivalents thereof.

We claim:

1. A method for monitoring the performance of a catalytic converter comprising the steps of:

monitoring voltage level transitions output by a first gas sensor in an exhaust gas stream located at a position upstream from the catalytic converter;

monitoring voltage level transitions output by a second gas sensor in the exhaust gas stream located at a position downstream from the catalytic converter;

calculating a first normalized parameter in response to a voltage level transition from the first gas sensor and calculating a second normalized parameter in response to a voltage level transition from the second gas sensor, wherein the first and second normalized parameters are expressed as EXP($-\beta'$), and wherein $\beta'$ is a mass transfer coefficient for the exhaust gas stream passing through the catalytic converter;

calculating a statistic representative of the first and second normalized parameters; and comparing the statistic with a reference standard to determine the performance of the catalytic converter.

2. The method of claim 1, wherein the step of calculating a first normalized parameter for the first gas concentration and calculating a second normalized parameter further comprises:

providing estimates for an air flow mass in the exhaust gas stream and for a temperature of a catalyst within the catalytic converter; and calculating a value for $\beta'$.

3. The method of claim 1, wherein the step of calculating a statistic comprises the steps of:

for each of the first and second normalized parameters:
calculating a plurality of normalized parameters for each voltage level transition;

providing a plurality of storage bins,
wherein each bin within the plurality of storage bins is defined by a numerical range;

sorting the plurality of normalized parameters by numerical value;

storing each of the plurality of normalized parameters in one of the plurality of storage bins having a range bounding the normalized parameter; and determining a number of normalized parameters in each of the plurality of storage bins; and for each of the plurality of storage bins having the same numerical range, determining a test ratio of the number of first and second normalized parameters.

4. The method of claim 3, wherein the step of comparing the statistic with a reference standard comprises the steps of:

determining a reference ratio for a plurality of normalized parameter values over a calibration range; and comparing the test ratio with the reference ratio for each of the plurality of normalized parameter values.

5. A method for monitoring the performance of a catalytic converter comprising the steps of:

providing an exhaust gas flow to a catalyst material within the catalytic converter;

providing a first sensor at a location upstream from the catalytic converter and a second sensor at a location downstream from the catalytic converter;

detecting a voltage level transition from the first and second sensors;

generating normalized values for the voltage level transitions of the first and second sensors using a normalizing parameter, wherein the normalizing parameter has a value dependent upon an exhaust gas flow rate and a catalyst material temperature estimated at each voltage level transition;

calculating a ratio of normalized values for the second sensor to the first sensor; and comparing the ratio of normalized values to predetermined reference values to determine an efficiency of the catalytic converter.

6. The method of claim 5, wherein the step of generating normalized values the voltage level transitions comprises the steps of:

calculating a value for $EXP(-\beta')$, where $\beta'$ is the mass transfer coefficient of the exhaust gas passing through the catalytic converter;

associating the value with a corresponding voltage level transition;

providing a first plurality of storage bins for the first sensor and a second plurality of storage bins for the second sensor, wherein each of the first and second plurality of storage bins is defined by a range of values for the normalizing parameter, and wherein each of the first and second plurality of storage bins contains a counter; and incrementing the counter within a designated bin each time a value is calculated that is within the range of values for the normalizing parameters defining the designated bin.

7. A method for monitoring the performance of a catalytic converter comprising the steps of:

providing an exhaust gas stream to the catalytic converter, wherein a first oxygen sensor resides upstream from the catalytic converter and a second oxygen sensor resides downstream from the catalytic converter;

continuously monitoring the first and second oxygen sensors for a voltage level transition;

providing values for a mass flow rate of air and a catalyst temperature;

calculating a coefficient determinative of a conversion efficiency of the catalytic converter for each voltage level transition using the mass flow rate of air and the catalyst temperature;

comparing the coefficient for each voltage level transition with a reference value;

providing a first counter responsive to the magnitude of the coefficient for first oxygen sensor and a second counter responsive to the magnitude of the coefficient for the second oxygen sensor;

outputting a pre-oxygen sensor count value and an aft-oxygen sensor count value;

determining a ratio of the aft-oxygen sensor count value to the pre-oxygen sensor count value; and comparing the ratio with a calibration standard to determine the performance of the catalytic converter.

8. A method for monitoring the performance of a catalytic converter comprising the steps of:

monitoring an output of a first sensor in an exhaust gas stream located at a position upstream from the catalytic converter;

monitoring an output of a second sensor in the exhaust gas stream located at a position downstream from the catalytic converter;

calculating a mass transfer coefficient using an exhaust mass flow rate and a catalyst temperature;

generating a monitoring parameter using the output of the first and second sensors;

normalizing the monitoring parameter to the mass transfer coefficient and accumulating a data set; and comparing values of the data set with pass/fail criteria to determine performance of the catalytic converter.

9. The method of claim 8, wherein the step of comparing values comprises the step of plotting the values of the data set against a range of values for the mass transfer coefficient.

10. The method of claim 8, wherein the step of calculating a mass transfer coefficient comprises calculating a mass transfer coefficient for the exhaust gas stream passing through the catalytic converter.

11. The method of claim 10, wherein the step of generating a monitoring parameter comprises detecting a voltage level transition from the first and second sensors.

12. The method of claim 11, wherein the step of accumulating a data set comprises the steps of:

calculating a value for a normalizing parameter by calculating a value for $EXP(-\beta')$, where $\beta'$ is the mass transfer coefficient;

associating the value with a corresponding voltage level transition;

providing a first plurality of storage bins for the first sensor and a second plurality of storage bins for the second sensor, wherein each of the first and second plurality of storage bins is defined by a range of values for the normalizing parameter, and wherein each of the first and second plurality of storage bins contains a counter; and incrementing the counter within a designated bin each time a value is calculated that is within the range of normalized parameters defining the designated bin.

13. The method of claim 11, wherein the step of accumulating a data set comprises the steps of:

determining a time interval between a voltage level transition of the first sensor and a voltage level transition of the second sensor;

calculating an exhaust gas residence time within the catalytic converter;

providing a plurality of storage bins, wherein each of the plurality of storage bins is defined by a range of values for the normalizing parameter;

calculating a switching delay by subtracting the exhaust gas residence time from the time interval; and storing the switching delay in one of the plurality of storage bins having a range bounding the normalizing parameter.

* * * * *